JAMES A. CLARK
INVENTOR.

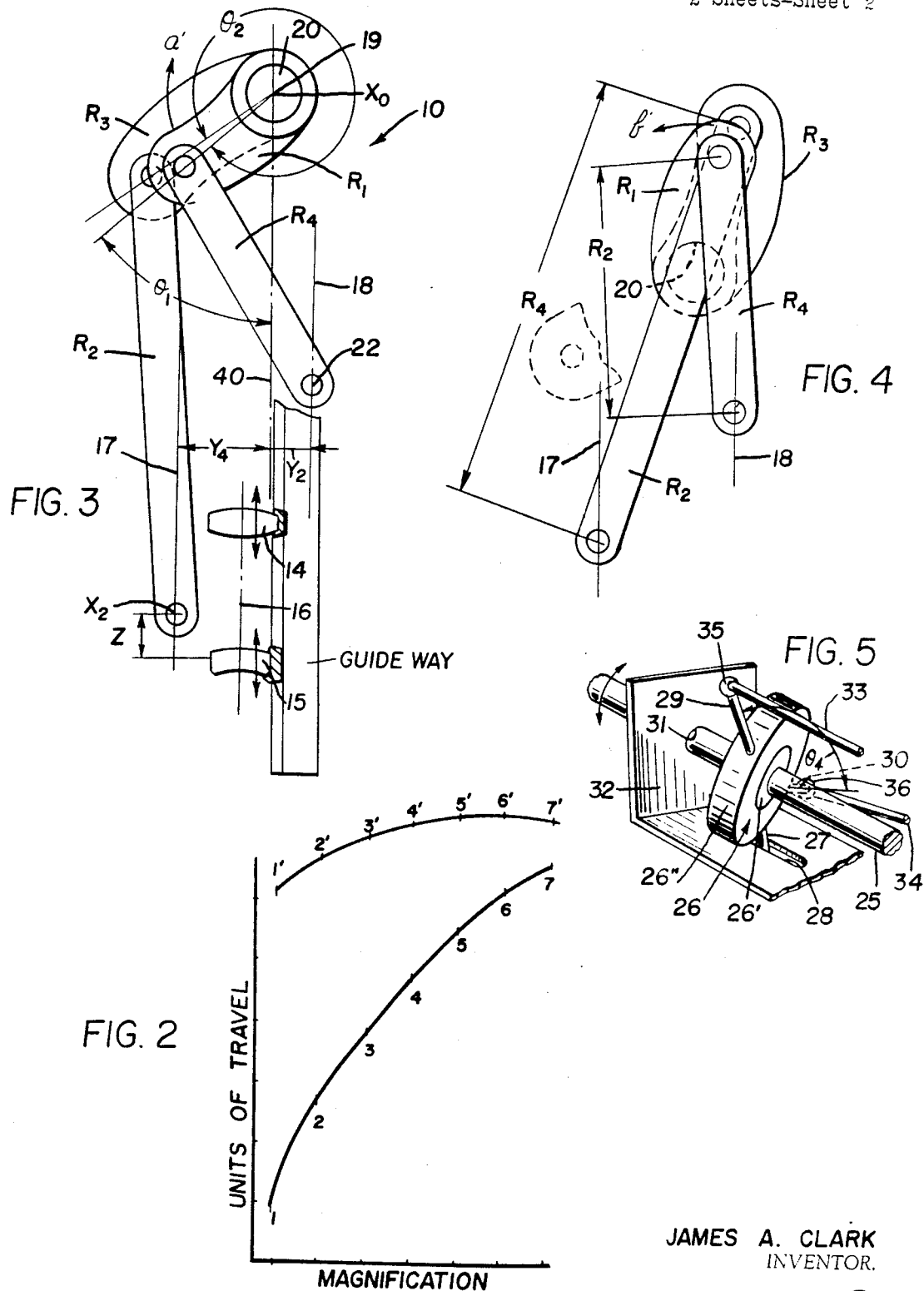

United States Patent Office 3,516,732
Patented June 23, 1970

3,516,732
CRANK AND LINK MECHANISM FOR NON-LINEARLY RELATED MOTIONS
James A. Clark, Brighton, N.Y., assignor to Bausch & Lomb Incorporated, Rochester, N.Y., a corporation of New York
Continuation-in-part of application Ser. No. 602,729, Dec. 19, 1966. This application May 23, 1967, Ser. No. 653,581
Int. Cl. G02b 7/04, 15/00
U.S. Cl. 350—187                                       3 Claims

ABSTRACT OF THE DISCLOSURE

A simple crank and link mechanism for moving two or more elements along parallel, straight paths relative to a fixed reference position, as in a zoom optical system, in conformance with arbitrarily predetermined motion laws that relate the motions to each other in a nonlinear manner. The cranks are fixed relative to each other and connected by simple links to pivot points which are mounted for straight motion along straight lines.

BRIEF SUMMARY OF THE INVENTION

This application is a continuation-in-part of my copending application, Ser. No. 602,729, filed Dec. 19, 1966, now abandoned.

This invention relates to a novel mechanism for producing plural, nonlinearly related, simultaneous, straight-line motions, and, more particularly, but not exclusively, to a mechanism for producing the motions required in a mechanically compensated zoom optical system.

Previous systems for producing nonlinearly related, simultaneous motions have been based mostly on the use of cams, which are difficult and expensive to manufacture where a high degree of precision and accuracy are required. The advantages of simple crank and link mechanisms have long been recognized, but such mechanisms have not found wide commercial utilization in zoom optical systems of high quality or in other apparatus where motions must be controlled with high precision. In constructions of this type heretofore proposed, accurately made cams were thought necessary and were included to achieve the required precision and accuracy of motion. The problem is one of immediate practical concern especially in connection with the control of elements in zoom optical systems of the mechanically compensated type, and the recent trend toward relatively large zoom ratios. The cams used in good quality zoom optical systems of the mechanically compensated type that have zoom ratios of greater than about five, for example, must be individually machined to extremely close tolerances, with the result that such systems are relatively expensive.

In accordance with the present invention, it has now been found that a simple crank and link mechanism employing only rotation and simple straight line motion at its principal points can be adapted by proper dimensioning of its parts to produce any of a large variety of combinations of motions that are nonlinearly related to each other, and that the motions may be made to correlate within any desired tolerance to any of a large number of predetermined motion laws such as, for example, the motion laws of many zoom optical systems. The first aspect of the invention, therefore, relates to the provision of a simple crank and link mechanism without cams and without lost motion for producing two or more nonlinearly related straight line motions.

Heretofore in the design of the crank and link drive mechanisms for zoom optical systems, the practice has been to set a crank and link system by trial and error that produces a loose approximation of the required motions, and then to calculate a cam for use in the arrangement that will correct the motion relationship to within the desired tolerance limits. In accordance with the invention, it has now been found that by iterative mathematical optimizing techniques, a simple crank and link type mechanism may be optimized to conform its output motions to the predetermined required motions within even the relatively close tolerances required for high quality zoom optical systems, and without the need for compensating cams or lost motion.

The practice of the invention permits further flexibility in that the mechanisms can usually be optimized even though some of the available variables are arbitrarily chosen and preset. Thus, for example, if certain parts are available from inventory, the system may be designed around them thus avoiding the need for producing special parts in their place. The practice of the invention also facilitates compensation for possible dimensional errors in manufacture of the parts, so that so long as the parts are all alike within the necessary tolerance limits, they may differ from the design requirements by a much larger factor, and the difference may be compensated for in many cases by adjusting easily changed dimensions in the system, thus further reducing manufacturing costs because only reproducibility of dimensions in manufacture need be maintained within close tolerances.

In general, a zoom lens system is ordinarily first designed by the optical engineer, who sets up equations defining the various motions of the system, plots curves representing the equations, and also calculates the various spacings in the system at a relatively large number of points in its travel, and the permissible positional tolerance at each position. All this data is presented to the mechanical engineer with the request for a mount that will provide the desired predetermined motions. The mechanical engineer works with this data and other design requirements as his base. In accordance with the invention, an imaginary model is first made of a simple crank and link mechanism with, in the first instance, nine independently variable dimensions and relationships. The imaginary model is then optimized, most conveniently with the assistance of an electronic computer, to ascertain values of the variables that will bring the output motions of the model to within the predetermined tolerance limits determined by the optical engineer. If the motions cannot be achieved within the desired tolerances, the imaginary model is changed to introduce additional variables, and the optimizing calculations are repeated.

The invention arose in connection with work on optical zoom systems, and will be described herein in connection therewith. It is, however, contemplated that the invention will find practical utilization in other systems and other fields of art wherein plural, simultaneous, non-linearly related, reciprocating motions are required.

DETAILED DESCRIPTION

The theory of the invention and a representative embodiment thereof will now be described in detail in connection with the accompanying drawings, wherein;

FIG. 2 is a chart showing a typical set of motion curves for an optically compensated zoom optical system of the type having two movable lens elements;

FIG. 3 is a partly schematic, plan view of an actual crank and link mechanism in accordance with the invention, showing the mechanism in one operative position;

FIG. 4 is a view generally similar to the view of FIG. 3, but showing the mechanism in another position; and, FIG. 5 is a fragmentary, perspective view, showing a wobble plate for mounting the crank arms of a motion mechanism according to the invention.

Figure 1:
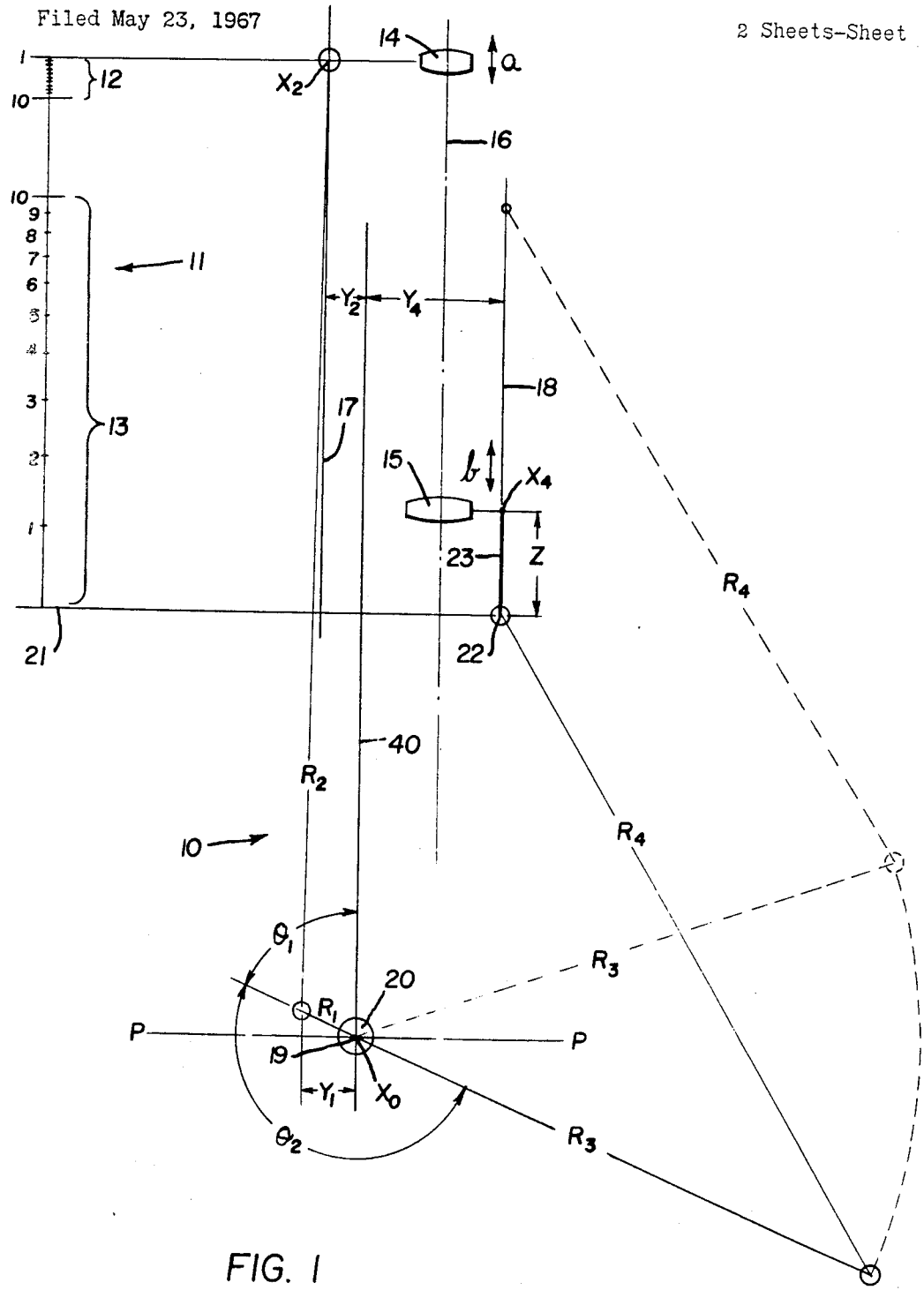
FIG. 1 is a schematic diagram of an imaginary model as used for calculating the dimensions and relationships of various components of a crank and link actuating mechanism for a zoom optical system in accordance with the invention.

For each member that is to be moved relative to a point of reference, a crank and link mechanism in accordance with the present invention includes a pivot fixed to the member and guided for straight line travel, a pivoted arm, and a link pivoted at one end on the arm and at its opposite end on the pivot fixed to the member. All of the arms are fixed relative to each other for rotation on a common axis.

To calculate the dimensions of the various components of the mechanism that will enable the mechanism to produce the desired motions within the desired tolerance limits, an imaginary model of a simple crank and link mechanism is first constructed such as the one shown in FIG. 1 for a zoom optical system with two movable elements. In the first instance, and until the optimizing calculations indicate that greater complexity is needed, the model is confined to a single plane, and the cranks rotate about an axis normal to the plane. In this case, nine independent variables are then available:

(a) The lengths of the two cranks $R_1$ and $R_3$,
(b) The lengths of the links $R_2$ and $R_4$,
(c) The spacings $Y_2$ and $Y_4$ between the lines of travel and the axis of rotation of the cranks,
(d) The angle $\theta_2$ between the two cranks $R_1$ and $R_3$,
(e) The difference Z between the lengths of any extensions that may be used between the lens elements 14 and 15 and the pivots $X_2$ and 22 carried by them, and
(f) The distance in the direction of motion between the axis of rotation $X_0$ and a fixed reference point $X_2$ In the usual case, these nine variables provide enough degrees of freedom to enable optimization by known calculating methods to conform the motion to the demands of the optical designer within the required tolerances. In the event the design motion relationship is complex and cannot be approximated satisfactorily by optimizing the single plane model, additional variables may be introduced by, for example, inclining the axes of rotation of the cranks to make the cranks rotate in planes inclined to the lines of the motion, or simply by spacing the cranks along the pivot axis so that the links $R_2$ and $R_4$ are skewed.

TYPICAL OPTIMIZING CALCULATION

A typical optimizing calculation for determining the dimensions of the various components of the linkage system comprises selecting arbitrary values for all of the variables of the imaginary model, taking care to avoid clearly unrealistic values. The model is then carried through its motion in a stepwise manner, and the positions of the motion points at each step are calculated and compared with the positions required by the optical design. The result of the comparison is a set of error figures. The finite difference approximation to the first derivative of each error figure is then calculated for each of the variables, and a set of simultaneous linear equations is prepared composed of the approximations to the first derivatives as the coefficients, the variables of the imaginary model as the variables in the equations, and the error figures as augments. The set is solved by any convenient method such as, for example, the method of damped least squares as described in a book entitled, "Recent Advances in Optimization Techniques," by A. Lavi and T. P. Vogl (1966) John Wiley & Sons, Inc., to produce a set of changes of values for the variables that would reduce the errors if the errors were truly linear functions of the variables. The process is iterative, and is repeated until values are found for the variables that reduce the errors to values within the design tolerance. If this cannot be done after a reasonable number of tries, additional degrees of freedom are introduced into the system by changing the imaginary model as hereinabove described, and the calculations are then repeated.

It is recognized that not all desired motions can be approximated with sufficient accuracy by the simple crank and link mechanism of the invention, but, nevertheless, the invention enables the use of the simple crank and link mechanism without the need for cams or lost motion in a large number of cases where heretofore the use of cams, or lost motion, or both had been regarded as necessary from a practical design point of view. In the practice of the invention there is usually an error, or a difference between the actual motion achieved and the motion prescribed, but the invention enables a reduction in the error to values that in most cases are smaller than can be attained by the use of commercially practicable cam and lost motion mechanisms.

A typical calculation will now be described in connection with FIG. 1. First, the paths of motion of the two motion points $X_2$ and 22 are set coincident with each other along a line which extends through the axis $X_0$ of the cranks. ($Y_2$ and $Y_4$ are set equal to zero.) The extremes of motion of the two movable members of the optical system 14 and 15 are located on the line of motion, and the pivot point $X_0$ for the crank system is set as far as convenient from the closest of the extremes of motion of the two lenses 14 and 15, while still keeping it within any space limitations which may be desirable for collateral reasons. The length of the first crank $R_1$ is set equal to the total motion of the lens member 14 to which it is link divided by $\sqrt{2}$. The length of the second crank $R_3$ is set equal to the total motion of the lens member 15 to which it is linked divided by $\sqrt{2}$. The settings of the lengths of the cranks $R_1$ and $R_3$ are based on a mid-point approach, assuming that the cranks $R_1$ and $R_3$ will start at positions inclined 45° from the direction of motion and will rotate through a total of 90° to accomplish the entire motion. The starting angle $\theta_1$ is, accordingly, set at 45°, and the angle $\theta_2$ between the two cranks $R_1$ and $R_3$ is set at 90°, 180° or 270° depending upon the motion laws to be satisfied, that is, whether the two lenses 14 and 15 start their motions in the same or opposite directions, and whether or not there is a reversal in the change of the spacing between them during their travel. The value Z is set equal to zero, that is, it is assumed that the extensions between the motion points $X_2$ and 22 and their respective lens elements 14 and 15 are of equal length. The lengths of the links $R_2$ and $R_4$ are then calculated in straight-forward manner by trigonometry, or, if desired, by use of a scale drawing.

An imaginary model of the linkage has thus been completed with arbitrarily assigned values for all of its dimensions and relationships. The next step is to divide the total travel of one of the lens elements 14 and 15, preferably the one which has the smaller excursion, into an arbitrarily chosen number, say twenty, of evenly spaced parts, thus determining twenty one evenly spaced points in the motion for use in carrying out the calculations. By trigonometry, it is then a straight-forward proposition to move the motion point $X_2$ stepwise from the first to each of the succeeding twenty evenly spaced points in its travel, and to calculate the position that the second motion point 22 will occupy at each of the twenty succeeding points. The positions occupied by the motion point 22 at all twenty-one points are then compared with the positions required by the optical design to produce a set of error figures. Ordinarily, these error figures are of a substantial magnitude for all but the starting and ending positions. (Because of the way in which the lengths of the cranks $R_1$ and $R_3$ were chosen, there is no error at the start and end of the motion in the initial calculation, but errors will be present there in subsequent stages of the calculations after changes have been introduced into the model.)

The next part of the procedure is to ascertain what changes can be made in the values assigned to the various dimensions of the system to reduce the error figures to acceptable limits. Finite difference approximations to the first derivatives of the errors with respect to each of the variables are then calculated. The approximations to the first derivatives are used as the coefficients in the preparation of a set of simultaneous linear equations, in which the variable dimensions of the linkage are the variables, and the errors as initially calculated are the augments. The simultaneous linear equations may be solved by the method of damped least squares for a set of changes in values of the variables which would reduce the errors if the errors were truly linear functions of the variables.

The changes so calculated are first reviewed by the designer for practicality in view of considerations such as overall space requirements, and the maximum angles between the links $R_2$ and $R_4$ and the direction of motion of the points $X_2$ and $22$. At this point, it may be desirable to fix the values of certain ones of the variables and regard them as constants for succeeding steps of the calculation. For example, if the solution of the set of simultaneous equations indicates an increase in one of the cranks $R_1$ and $R_3$ to an impractical length, the length of the crank may be regarded as fixed at the maximum practical value.

The calculated changes so modified are then made in the imaginary model, and the calculations are repeated to determine the values of the errors that remain in the system. If the changes reduce the errors to within the desired tolerances, the design is done. If not, there are two options, the choice of which depends upon the degree of reduction in error achieved by making the changes.

If the reductions are appreciable, the model as changed is used as the basis for determining the finite difference approximations to the first derivatives of each new error with respect to each of the variables, and a new set of simultaneous linear equations is set up and solved for a new set of changes. If the errors are not significantly reduced by the changes initially introduced, the first prepared set of simultaneous linear equations is again subjected to the method of damped least squares, but with the damping factors multiplied by a factor of five. If the set of changes then produced does not result in an adequate reduction in the errors in the system, it may be necessary to introduce additional degrees of freedom, and, correspondingly, additional variables such as, for example, by spacing the two crank arms $R_1$ and $R_3$ along their common axis so that one or the other, or both of the links $R_2$ and $R_4$ are skewed out of the plane of the initial co-planar imaginary model, or by inclining the axis of rotation $X_0$ to skew the system further.

As mentioned hereinabove, the practice of the invention enables the loosening of accuracy tolerances in the manufacture of the component parts of the mechanism, because it facilitates compensation for variations between the dimensions called for by the design and the dimensions of the manufactured components. Fine tolerance limits are relatively easily achieved for precision, that is, it is not a difficult matter to ensure that all replicas of each component are identical to within very close dimensional limits. It is much more expensive, however, to ensure high accuracy, that is, conformance of the parts to predetermined dimensions.

In the practice of the invention, fine tolerance limits may be set for precision, and relatively looser limits for accuracy. The actual dimensions of the manufactured parts are then used in calculations similar to those hereinabove described to find changes in dimensions that can be adjusted by shims or other inexpensive devices which will compensate for errors introduced by the manufacturing error.

For example, the dimension Z and the distance between the crank axis $X_0$ and the reference point $X_2$ of the imaginary model may usually be changed very simply by inserting a shim behind a lens mount, and the dimensions $Y_1$ and $Y_2$ may often be easily adjusted a small amount in similar manner.

It is also possible, although not usually desirable, to compensate for manufacturing errors by adjusting the optical design. The manufacturing tolerance for accuracy, although much greater than tolerance for precision, will normally result in only a trivial error in the optical system. It is usually not a difficult matter using presently available computer programs to calculate a small change in the optical system that will compensate adequately for the error resulting from the manufacturing tolerance.

FIGS. 3 and 4 illustrate an actual coplanar linkage in accordance with the invention designed for a zoom optical system of the mechanically compensated type. It will be noted that the shorter link $R_4$ has an over-center action which brings about a reversal in the travel of the optical element 14 driven by it as required by the motion law, while the longer link $R_2$ does not have an over-center action, but drives its optical element 15 always in the same direction through the motion.

Additional degrees of freedom may be introduced in the design of mechanisms according to the invention by the use of a wobble plate 26 as shown in FIG. 5 in place of the simple cranks described hereinabove. The wobble plate 26 may also be preferred in cases where it is desired to provide an input rotation for driving the mechanism aligned along an axis parallel to the lines of motion of the system. The wobble plate construction includes an outer annulus 26″ to which the arms 29 and 30 are fixed. The outer annulus 26″ is journalled on an inclined inner disc 26′, which is fixed to the shaft 25. The outer annulus 26″ is restrained from rotation by a pin 27, which is fixed to it and extends into a slot 28 in the mounting plate. The links 33 and 34 are secured at the outer ends of the crank arms 29 and 30 by simple universal ball joints 35 and 36. As the shaft 25 is rotated, the arms 29 and 30 swing back and forth about a tilting axis normal to the axis of rotation of the input drive shaft 25. The ball points 35 and 36 describe spherically curved figure-eight patterns in accordance with known geometric principles. The figure-eight patterns vary in accordance with the angular spacings between the arms 29 and 30 and the restraining pin 27, thus making additional variables available to the designer. Also, if desired, the restraining pin 27 may be used as an arm for driving one of the links 33 and 34 following a straight path.

What is claimed is:

1. A crank and link mechanism for a zoom optical system for producing plural motions that are related to each other in a preselected nonlinear manner comprising:
   (a) movable members for mounting lens elements of a zoom system,
   (b) guide means mounting said members for reciproatable translation,
   (c) crank arms, one for each of said members, said arms being fixed relative to each other and arranged for rotation about a common axis,
   (d) links connected between said movable members and the distal ends of respective ones of said crank arms for moving said members responsively to rotation of said crank arms,
   (e) the connections of said links being by pivots, each of said pivot connections being of the type that allows only rotational motion between the members connected by it,
   (f) the mechanism being characterized in that its dimensions and spacings are selected so that throughout the operating range of the mechanism the motions of the movable members relative to each other follow a predetermined nonlinear relationship within predetermined tolerances.

2. A mechanically compensated zoom optical system of the kind having plural lens elements two of which are movable relative to each other and to a third comprising:
   (a) movable lens elements mounted for translation,
   (b) means defining a pair of crank arms fixed relative to each other and rotatable about a common axis angularly displaced from the direction of translation of said lens elements,
(c) a pair of pivots carried separately and respectively by the two movable elements,
(d) a first link pivotally connected between a first one of said pivots and a first one of said crank arms for driving one of the elements responsively to rotation of said crank arms, and
(e) a second link pivotally connected between the second one of said pivots and the other crank arm for driving the other element,
(f) the connections of said links being by pivots, each of said pivot connections being of the type that allows only rotational motion between the members connected by it,
(g) the mechanism being characterized in that its dimensions and spacings are selected so that throughout the operating range of the system the motions of the movable elements relative to each other follow the predetermined relationship required to maintain the resolution of the system within predetermined tolerances.

3. A mechanism for producing plural motions in a zoom optical system that are related to each other in a preselected nonlinear manner comprising:
(a) a wobble plate,
(b) radially projected angularly spaced arms fixed to said wobble plate, one of said arms for each of the motions to be produced,
(c) movable lens mounts equal in number to said arms and mounted for translation, and
(d) links connected between said movable mounts and the outer ends of respective ones of said projecting arms for moving said members responsively to operation of said wobble plate,
(e) the connections of said links being by pivots, each of said pivot connections being of the type that allows only rotational motion between the elements connected by it,
(f) the lengths of said arms and of said links, the angular spacing between said arms, and the inclination of said wobble plate being selected so that throughout the operating range the motions of the movable mounts relative to each other follow a predetermined nonlinear relationship within predetermined tolerances.

References Cited
UNITED STATES PATENTS

| | | | |
|---|---|---|---|
| 812,636 | 2/1906 | Callan | 74—60 |
| 1,856,432 | 5/1932 | Rudolph et al. | 95—45 |
| 2,355,136 | 8/1944 | Bedford | 95—45 |
| 3,023,520 | 3/1962 | Matticoli | 350—187 |
| 3,051,048 | 8/1962 | Mahn | 350—187 |
| 3,221,628 | 12/1965 | Mahn | 95—45 |

FOREIGN PATENTS

| | | |
|---|---|---|
| 979,064 | 4/1951 | France. |
| 1,013,136 | 7/1952 | France. |
| 725,513 | 5/1932 | France. |

PAUL R. GILLIAM, Primary Examiner

U.S. Cl. X.R.
350—44, 184